(12) United States Patent
Volland et al.

(10) Patent No.: US 6,484,039 B1
(45) Date of Patent: Nov. 19, 2002

(54) SIM CARD WITH DIRECTORY ENTRIES FOR MOBILE TELEPHONES

(75) Inventors: Rainer Volland, München (DE); Bernd Adameit, München (DE); Karsten Homann, Ebenhausen (DE)

(73) Assignee: Siemens Aktiengesellschaft, München (DE)

( * ) Notice: Subject to any disclaimer, the term of this patent is extended or adjusted under 35 U.S.C. 154(b) by 138 days.

(21) Appl. No.: 09/645,239

(22) Filed: Aug. 24, 2000

Related U.S. Application Data

(63) Continuation of application No. PCT/DE99/00218, filed on Jan. 28, 1999.

(30) Foreign Application Priority Data

Feb. 25, 1998 (DE) .......................................... 198 07 934

(51) Int. Cl.$^7$ .............................. H04B 1/38; H04M 1/00
(52) U.S. Cl. ...................................... 455/558; 455/564
(58) Field of Search ................................. 455/558, 564, 455/575, 550, 90, 551, 422, 410, 411; 379/457.01, 357.05; 235/492, 441; 340/7.35

(56) References Cited

U.S. PATENT DOCUMENTS 5,940,773 A * 8/1999 Barvesten ................... 340/7.45
6,141,564 A * 10/2000 Bruner et al. .......... 379/357.01
6,370,374 B1 * 4/2002 Eichinger et al. ............ 455/411

FOREIGN PATENT DOCUMENTS

| DE | 38 44 032 A1 | 1/1990 |
| DE | 38 12 147 C2 | 5/1993 |
| EP | 0 733 992 A2 | 9/1996 |

OTHER PUBLICATIONS

Japanese Patent Abstract No. 08111709 (Takayuki), dated Apr. 30, 1996;.

"The Subscriber Identity Module For the European Digital Cellular System GSM" (Mazziotto), dated Jun. 26, 1990, Chairman of the GSM Subscriber Identity Module Expert Group, pp. 1–9;.
"GSM Global System for Mobile Communications", dated Dec. 1995, GSM Technical Specification, XP–002107246, version 5.0.5, pp. 62–64;.
"A Hierarchic System: IMS", dated 1992, XP–002107281, pp. 753–763;.
"Die Multifunktionale Chipkarte—Eine Karte für viele Zwecke" (Hartleif), dated 1993, Telekom Praxis 10/93, pp. 16–22, pertains to a multifunctional chip card—a multipurpose card;.
"Chipkarten—klein im Format, groß in der Leistung" (Kruse), dated 1998, Siemens AG, Bereich Kommunikations– und Datentechnik, Systemplanung, München, pp. 227 and 228, pertains to chip cards—small format, high performance;.
"Die Chip–Karte—Multifunktionskarte der Zukunft" (Kunz), dated 1986, Hasler–Mitteilungen Nr. 4, pp. 75–83, pertains to the chip card—multifunctional card of the future.

* cited by examiner

Primary Examiner—Nay Maung
Assistant Examiner—Lewis West
(74) Attorney, Agent, or Firm—Laurence A. Greenberg; Werner H. Stemer; Ralph E. Locher

(57) ABSTRACT

A subscriber identity module (SIM) card for mobile telephones contains a field of abbreviated dialing numbers (AND) and/or fixed dialing numbers (FDN) data records, corresponding to the GSM specification for storing telephone entries. The AND data record (or FDN data record) contains a sector that references a first extension data record. In this case, the first extension data record, contains three sectors, and has in its first sector an identifier that identifies it as a "hierarchical" data record. The extension data record refers to one or more further data structures that define the hierarchical order of the telephone entries. Furthermore, it is possible to form a chain of extension data records which refer to one another, and in which all extension data records are hierarchical starting from a specific index.

10 Claims, 4 Drawing Sheets

SIM CARD WITH DIRECTORY ENTRIES FOR MOBILE TELEPHONES

CROSS-REFERENCE TO RELATED APPLICATION

This is a continuation of copending International Application PCT/DE99/00218, filed Jan. 28, 1999, which designated the United States.

BACKGROUND OF THE INVENTION

FIELD OF THE INVENTION

The invention relates to a subscriber identity module (SIM) card for mobile telephones and, in particular, to the storage of directory entries on the SIM card for mobile telephones.

The number of directory entries in mobile telephones is constantly increasing because of the rising capacity of SIM cards. Thus, at present, it is possible to store up to 255 entries in an abbreviated dialing number (ADN) field or a fixed dialing number (FDN) field of the SIM card. However, it is not possible to store the directory entries in a hierarchical structure in the directories of current SIM cards, that is to say to organize the entries in various levels. The data structure of the SIM card including the definition of the ADN and FDN data records is, for example, explained in global system for mobile communications (GSM) specification 11.11, version 5.0.0 dated December 1995.

Telephones which organize their entries hierarchically, that is to say permit several telephone numbers per entry, or else assign only to that entry an identifier such as, for example, office or FAX therefore store this information not on the SIM card but in the telephone set itself. As a result, serious problems arise when the card is switched to other telephones that do not support the structure. For example, changing the memory location number in another telephone can lead to a false allocation of the identifier to a number when the SIM card is read by the telephone which contains the designations of the individual numbers.

SUMMARY OF THE INVENTION

It is accordingly an object of the invention to provide a SIM card with directory entries for mobile telephones which overcomes the above-mentioned disadvantages of the prior art devices of this general type, which has a data structure that permits a hierarchical directory, and the SIM card and its data structure being downwardly compatible.

With the foregoing and other objects in view there is provided, in accordance with the invention, a subscriber identity module (SIM) card for mobile telephones. The SIM card contains a memory programmed with extension data records, further data structures defining a hierarchical order of telephone entries, and initial data records corresponding to a global systems for mobile communications (GSM) specification for storing the telephone entries. The initial data records are selected from the group consisting of a field of abbreviated dialing number (ADN) data records and a field of fixed dialing number (FDN) data records. Each of the initial data records contains a sector which can reference one of the extension data records such that it is possible to form an ordered chain of the extension data records referencing one another. Each of the extension data records are formed of three sectors including an identifier sector having an identifier for identifying a respective extension data record as a hierarchical extension data record. In turn, the hierarchical extension data record references at least one of the further data structures.

The SIM card according to the invention for mobile telephones contains a field of ADN and/or FDN data records, corresponding to the GSM specification for storing telephone entries, an ADN data record (FDN data record) containing a sector which references a first extension data record. In the simplest case, the first extension data record, contains three sectors, and has in its first sector an identifier which identifies it as a "hierarchical" data record, and the extension data record refers to one or more further data structures which define the hierarchical order of the telephone entries. It is also possible for the first extension data record still not to be a hierarchical data record. In this case, the first extension record refers to a further second extension data record which is identified as "hierarchical" by its first sector. Further following extension data records which relate, possibly via a chain of extension data records, to the first "hierarchical" extension data record, are likewise of "hierarchical" type. Expressed in general terms, the interlinking may be explained as follows: there can be a sequence of N extension data records for an ADN or FDN data record of an appropriate field, N being a natural number greater than zero, such that an nth extension data record with $n \in \{0, \ldots, N-1\}$ references the (n+1)th extension data record, the data record for n=0 being identical with the ADN or FDN data record, at least a kth extension data record with $k \in \{1, \ldots, N\}$ being identified as hierarchical extension data record, and all further jth extension data records with $j \in \{k+1, \ldots, N\}$ likewise being "hierarchical" extension data records.

The hierarchical extension data record has an identifier sector, an extension data sector and a reference sector. In this case, the extension data sector is constructed from the subsectors type field, reference or link field and a further third sector. The link field contains a predetermined number of subaddresses, each subaddress referring to a further data structure, and the type of the subaddress being fixed by the type field. The extension data sector preferably contains the subsector type field with a length of 2 bytes, 8 subaddresses with a length of 1 byte in each case, and a subsector, which is reserved for later use, with a length of 1 byte.

The further data structures contain at least one subnumber field and/or one group field. A data record of the subnumber field contains an identifier of the number type and a number. A data record of a group field contains an identifier of the group name and a reference sector, a reference sector a referring to an overgroup.

Depending on the type of subaddress, the subaddress containing a reference and fixed by the type field refers to a data record of a subnumber field or to that of a group field.

Other features which are considered as characteristic for the invention are set forth in the appended claims.

Although the invention is illustrated and described herein as embodied in a SIM card with directory entries for mobile telephones, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
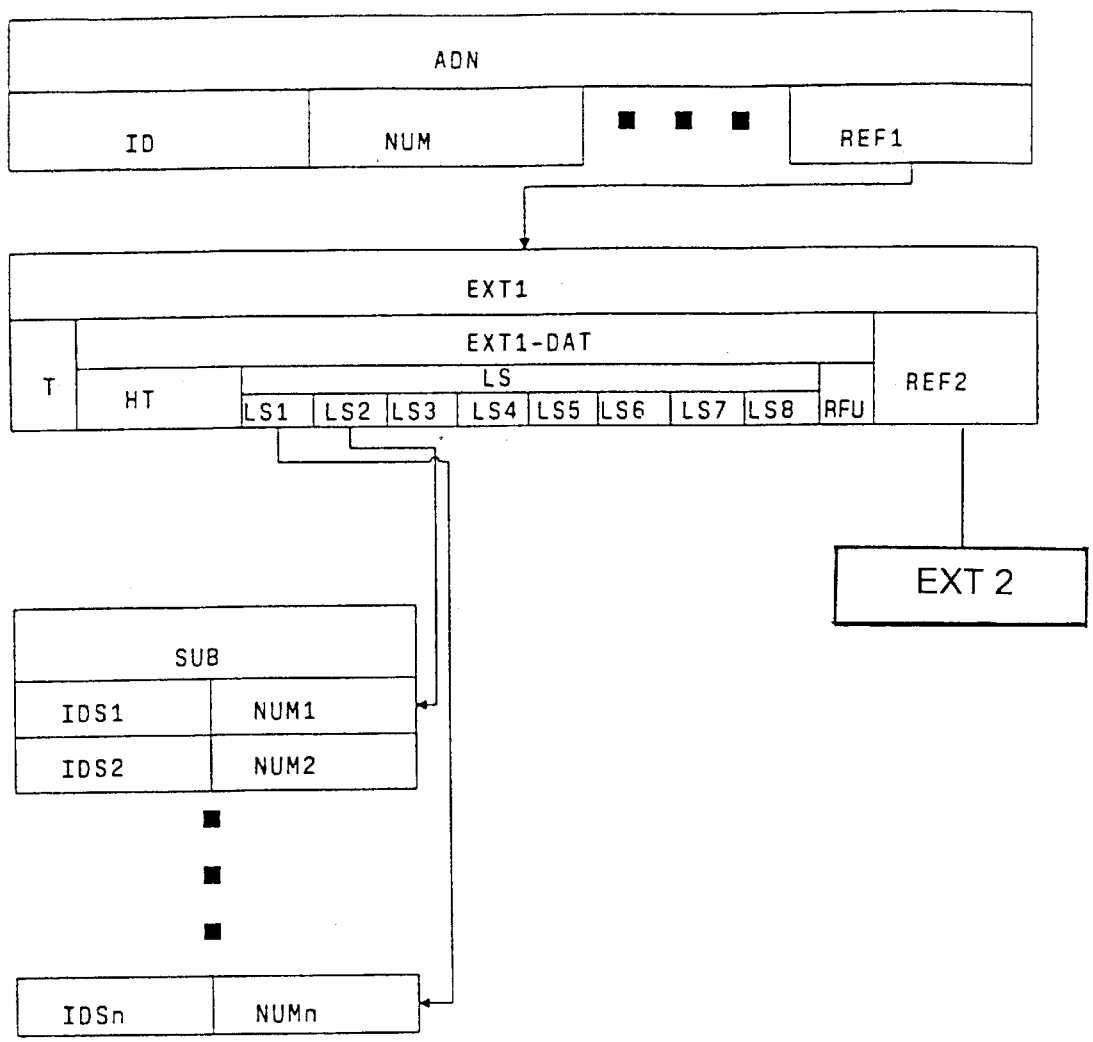
FIG. 3 is a block diagram showing an implementation of a data structure of a SIM card for the case shown in FIG. 1.
Figure 4:
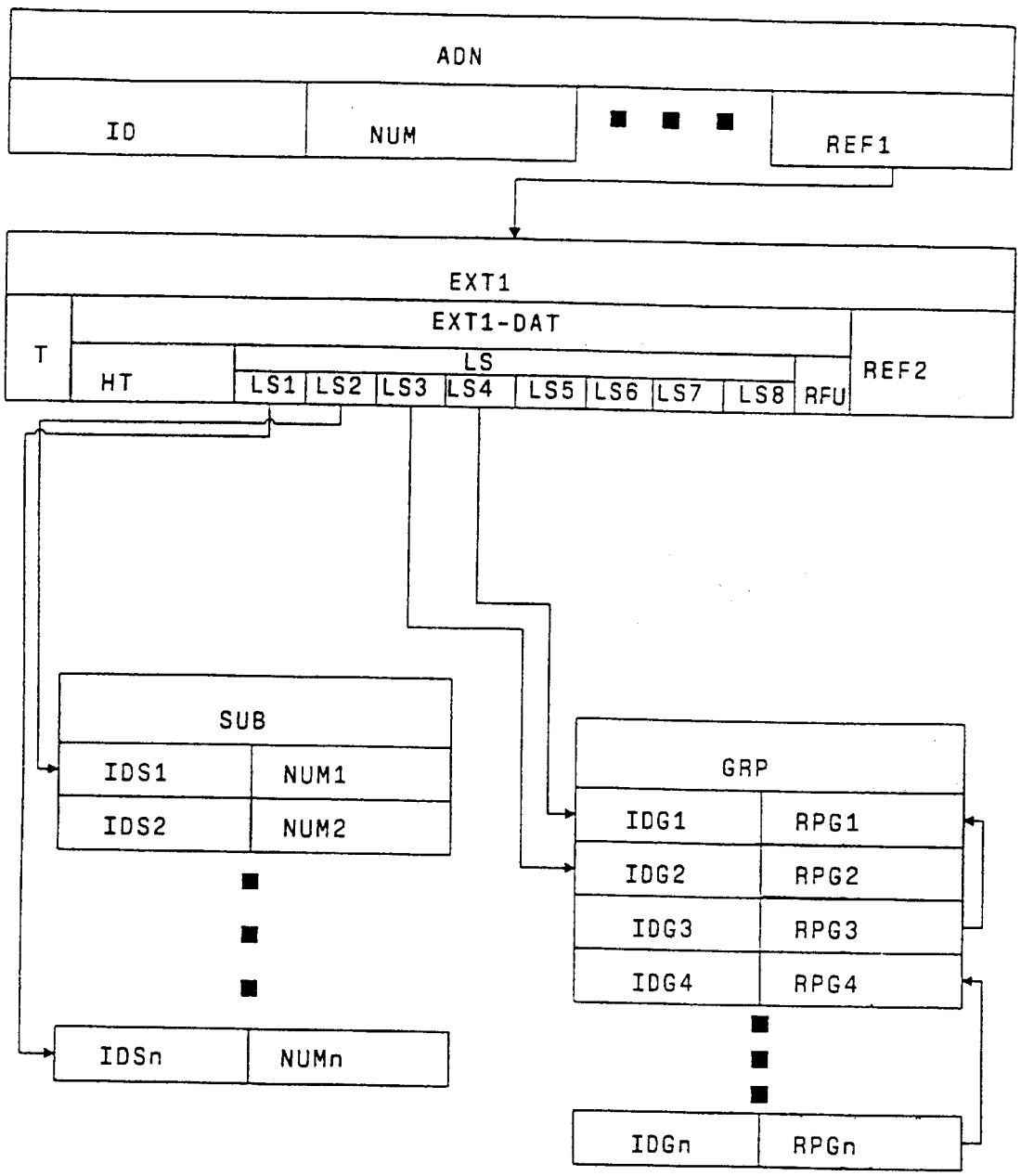
FIG. 4 is a block diagram showing the implementation of the data structure of the SIM card for the combination of the cases of FIGS. 1 and 2.

In all the figures of the drawing, sub-features and integral parts that correspond to one another bear the same reference symbol in each case. Referring now to the figures of the drawing in detail and first, particularly, to FIGS. 1 and 2 thereof, there are shown examples which are intended to explain an extension of a subscriber identity module (SIM) structure. In this case, FIG. 1 explains the concept of an ho entry with several associated numbers and/or identifiers, while FIG. 2 addresses the concept of group entries. The two concepts are used with one another on a SIM card, as emerges from the implementation of the data structures that are illustrated in FIGS. 3 and 4. The SIM card has a processing unit PROS with a memory MEM for processing and storing data records.

Figure 1:
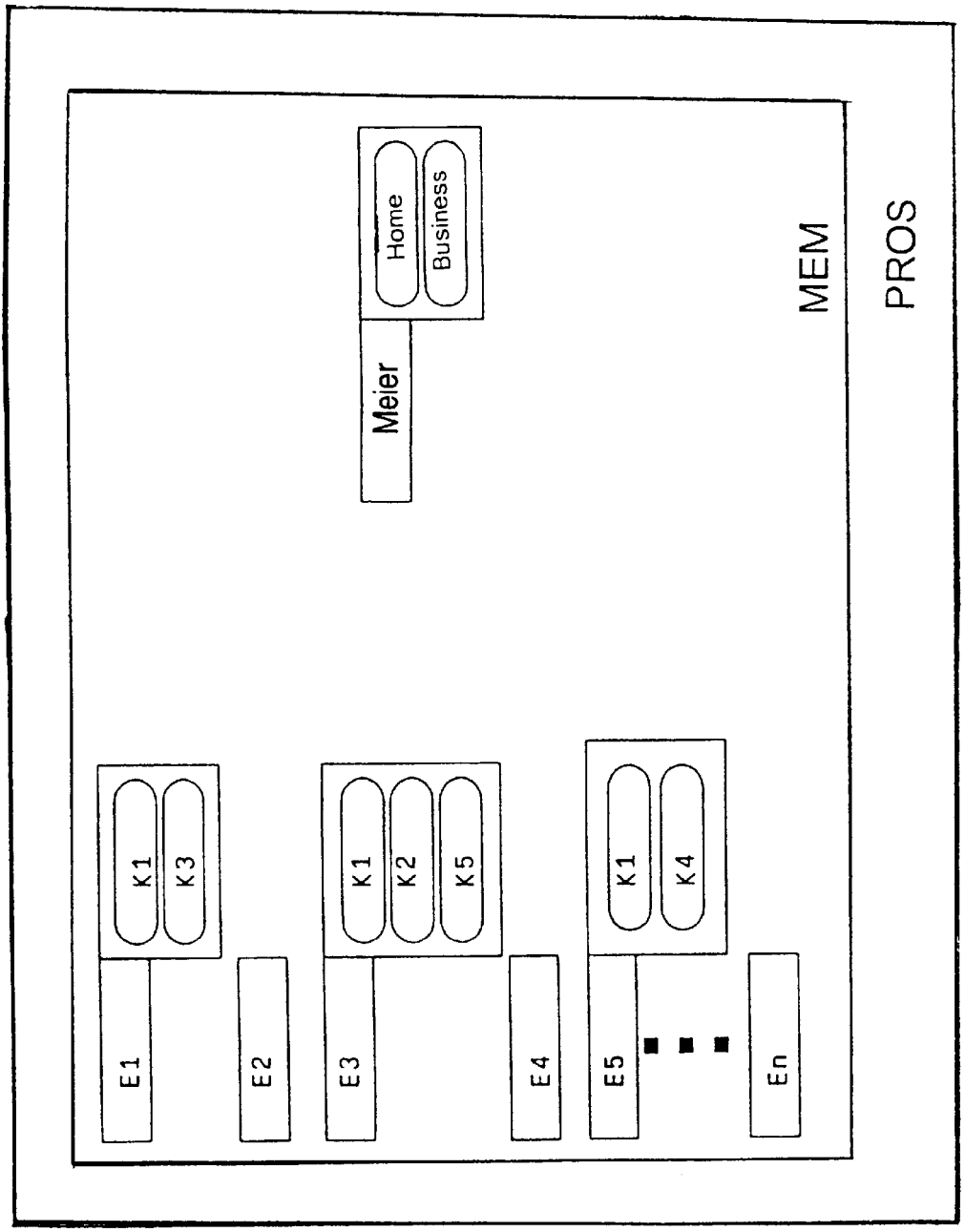
FIG. 1 is a block diagram showing an example of entries with several associated numbers and/or identifiers according to the invention.

As FIG. 1 shows, it is possible here for there to be not only one, but several assigned telephone numbers for each entry. The numbers are assigned an identifier by the user, for example a mobile telephone, home, office, etc. The identifier can be predefined depending on a user interface, or be freely selectable. This is illustrated in FIG. 1 by virtue of the fact that one or more categories are assigned to each entry, but it not being absolutely necessary for a category to belong to each entry. Thus, the categories K1 and K3 belong to the entry E1, while no category is assigned to the entry E2. In accordance with the left-hand part of FIG. 1, entries E1 to En to which corresponding categories are assigned can be present. In the example of the right-hand part of FIG. 1, the categories "home" and "office", belong to the entry Meier.

Figure 2:
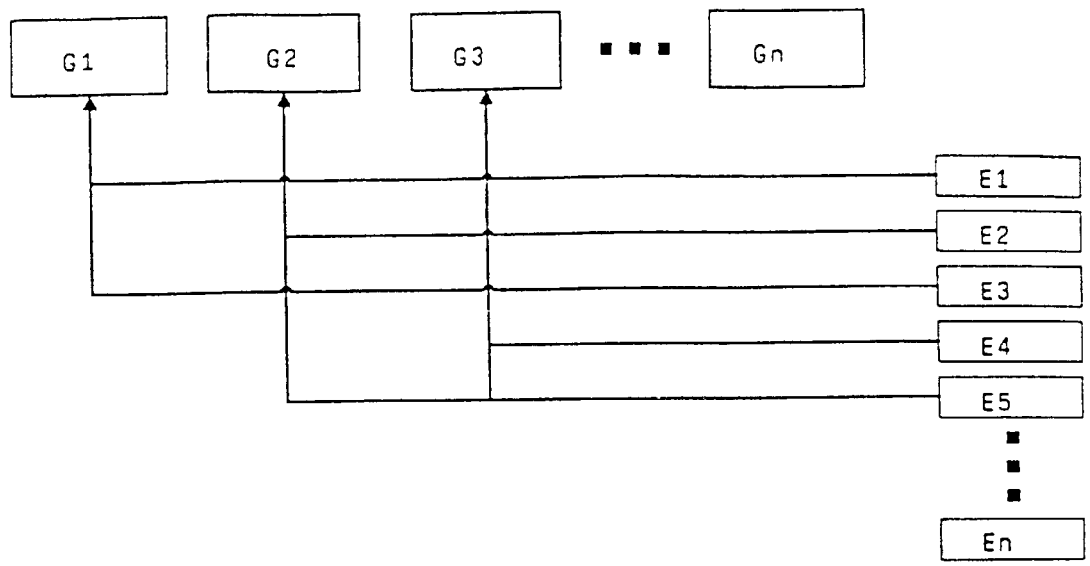
FIG. 2 is a block diagram of an example of groupings of the entries into groups.
Figure 2:
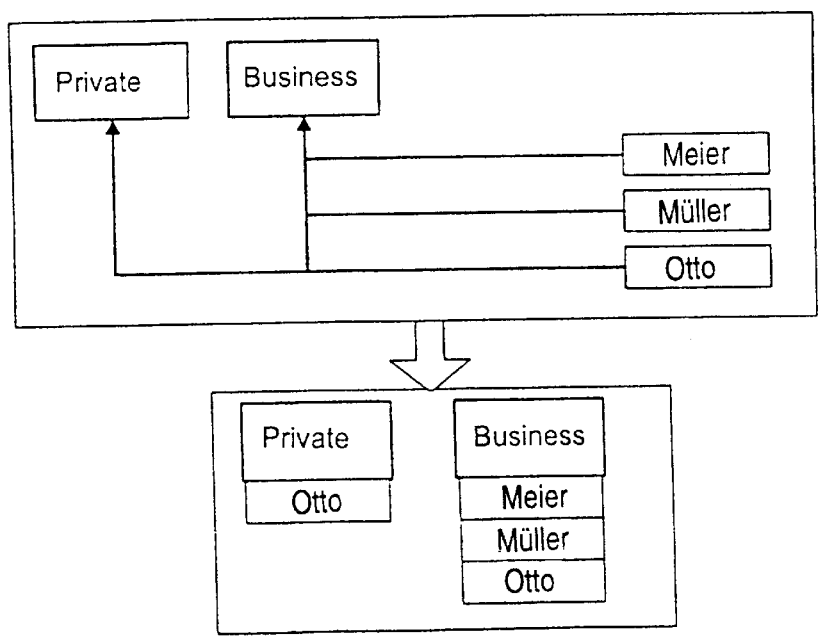

FIG. 2 shows the concept of the group entries, where it is possible to apply groups with freely selectable names which can then be assigned already existing or new entries such as names or numbers. It is possible in this way, for example, to store all employees of a specific company in the group with the names of the company, thus permitting the entry to be found more easily.

This state of affairs is illustrated schematically in the top part of FIG. 2. Groups G1, G2 to Gn are present to which it is possible to assign entries El, E2 to En as desired. For example, group G1 is assigned the entries E1 and E3, group G2 the entries E2 and E5, and group G3 the entries E4 and E5. It is therefore to be seen that the entries can belong to several groups.

The lower part of FIG. 2 shows an example of the group concept. The groups of "private" and "business" are illustrated. Only the entry "Otto" belongs to the group "private", while the entries of "Meier", Müller and "Otto" belong to the group "business". A visualization of the membership is outlined below showing the combination relationships.

FIG. 3 shows the data structure on the SIM for the case of FIG. 1, only a sequence containing an extension data set EXT1 being represented, for the sake of simplicity and clarity. Defined on the SIM in accordance with the GSM specification 11.11, version 5.0.0 dated December 1995 is a linear structured data record ADN which contains a prescribed number of sectors and starts with an identifier sector ID of a prescribed length, and whose last sector is a reference sector REF1 which refers to a first extension data record EXT1. In general, the reference sector REF1 is one byte long, that is to say it contains a transfer address which refers to the first extension data record EXT1 if an extension data record is required. The first extension data record EXT1 likewise has a linear structure and contains a predetermined number of sectors. In accordance with the GSM specification, the extension data record EXT1 contains 13 bytes. The data record EXT1 containing in the preferred embodiment three sectors, specifically a first sector data record type T with a length of 1 byte, a second sector extension data EXT1-DAT with a length of 11 bytes, and a third sector reference data REF2 with a length of 1 byte. The sector reference data REF2 refers, if appropriate, to a further extension data record EXT2, which is likewise of the type "hierarchical" data, when the referring extension data record EXT1 is "hierarchical".

The sector data record type T contains the information that the extension data record EXT1 is a data record of a new type "hierarchical combinations". An older mobile telephone, which does not have the extension of the SIM data structure for hierarchical directory entries, therefore uses the coding of the first sector T to interpret the extension data record EXT1 as unknown, as a result of which the downward compatibility is ensured.

The second sector extension data EXT1-DAT is also divided into three subsectors. The first subsector type field HT, which is two bytes long, contains hierarchical type data. The second sector link LS, which is eight bytes long, contains eight subaddresses LS1 to LS8 with a length of 1 byte in each case. The third subsector RFU, which is 1 byte long, is reserved for later purposes.

The subaddresses LS1, . . . , LS8 of the subsector link LS refer to corresponding data records in a subnumber field SUB, a data record of the subnumber field SUB containing an identifier of the number type IDS1, . . . , IDSn and an associated number NUM1, . . . , NUMn. For example, in the example illustrated the subaddress LS1 refers to the data record IDS1, NUM1, and the subaddress LS2 refers to the data record IDSn, NUMn of the subnumber field SUB.

The subsector type field HT, which contains information on the type of the subaddresses LS1, . . . , LS8, distinguishes in this first step only between "reference to a subnumber" and "no reference"that is to say it is established in the first subsector whether a subaddress LS1, . . . , LS8 contains a reference to the subnumber field SUB or not.

Furthermore, it is possible to refer to a next (second) extension data record (not illustrated) via the third sector REF2 of the first extension data record EXT1 if the first extension data record EXT1 does not suffice. Of course, an extension going beyond this is possible. The formation of such a sequence of extension data records referring to one another is explained in the preceding general part of the description.

The data records of the field subnumbers SUB are constructed in a fashion similar to the ADN data record, but contain no reference to an extension data record.

A subnumber data record IDSi, NUMi, i=1 . . . , 8 of the subnumber field SUB generally specifies a new subnumber, for example "official": +498972224795. If a subnumber data record contains no dialing string (telephone number), the single identifier IdSi (for example "Private") can be regarded as an approximate description of the referring corresponding entry.

FIG. 4 now shows the extension of the SIM data record of FIG. 3 about the group structure illustrated in FIG. 2.

Here, as well, the third sector REF1 of the ADN/FDN data record ADN refers to the first extension data record EXT1, which has the structure explained above with the aid of FIG. 3. However, here the subsector type field HT, which determines the type of the following subaddress LS1, . . . , LS8, has a wider significance. Depending on its determination in the subsector type field HT, in the extended case a subnumber LS1, . . . , LS8 can refer to a data record IDSi, NUMi, i∈({1 . . . , 8}, of a subnumber field SUB, or to a data record IDGi, RPGi, i∈(1 . . . , 8), of a group field GRP. In this case, the sector IDGi, i∈{1 . . . , 8} contains an identifier of the group name, and the sector RPGi, i∈{1 . . . , 8} contains a reference to an overgroup. The identifier IDGi, i∈{1, . . . , n}, which contains X bytes, of a group can contain an arbitrary identifier of the group, while the reference RPGi, i∈{1, . . . , n}, referring to the overgroup, is one byte long. The groups can therefore be classified hierarchically. An uppermost group (top level group) is produced by setting the corresponding reference RPGi, i∈1, . . . , n to zero. For example, FIG. 4 shows references from the group reference sector RPGn to RPG4 and from RPG3 to RPG1.

Consequently, it is now possible in the case of the subsector type field HT in the extension data record EXT1 to distinguish between "reference to subnumber", "reference to group" and "no reference". An entry is allocated to a group or several groups by the reference to one or more entries in the new field "group" GRP.

The measures explained above for extending the SIM to hierarchical directories holds not only for ADN data records but, in the same form, for the FDN data records (FDN=Fixed Dialing Number, see the GSM specification mentioned). Since in the case of the concept according to the invention there is never a reference from an extension data record to an ADN or FDN entry, and there is therefore no need for a unique identifier, it is to expected that the identifier will be maintained nevertheless in the case of a change to the entry (name, number at a fixed memory location) by a telephone which does not support the extended structure (denoted below as "old telephone"). When the entry is copied over, the reference to the extension data record is also copied. However, in the case of an old telephone the reference to the extension data record could be overwritten, for example if the number of a hierarchical entry is extended in an old telephone such that it requires an extension data record. In order therefore to ensure the downward compatibility, it is possible to provide a test procedure which searches the SIM for non-referenced extension data records and their associated fields, and brings about an appropriate error handling.

We claim:

1. A subscriber identity module (SIM) card for mobile telephones, comprising:

a memory programmed with extension data records, further data structures defining a hierarchical order of telephone entries, and initial data records corresponding to a global systems for mobile communications (GSM) specification for storing the telephone entries;

said initial data records selected from the group consisting of a field of abbreviated dialing number (ADN) data records and a field of fixed dialing number (FDN) data records, each of said initial data records containing a sector which can reference one of said extension data records such that it is possible to form an ordered chain of said extension data records referencing one another, each of said extension data records formed of three sectors including an identifier sector having an identifier for identifying a respective extension data record as a hierarchical extension data record, and said hierarchical extension data record referencing at least one of said further data structures.

2. The SIM card according to claim 1, wherein said ordered chain of said extension data records contains said hierarchical extension data record as a first hierarchical extension data record and remaining ones of said extensions data records in said ordered chain each have a hierarchical type identifier.

3. Th e SIM card according to claim 1, wherein said hierarchical extension data record is formed of said identifier sector, an extension data sector and a reference sector.

4. The SIM card according to claim 3, wherein said extension data sector is formed of a type field, a link field, and a further sector.

5. The SIM card according to claim 4, wherein said link field contains a predetermined number of subaddresses, each of said subaddressees referring to one of said further data structures, and said subaddresses each having a type being fixed by said type field.

6. The SIM card according to claim 5, wherein said type field has a length of two bytes, said link field contains eight of said subaddresses each having a length of one byte, and said further sector has a length of one byte.

7. The SIM card according to claim 6, wherein said further data structures contain at least one of a subnumber field and a group field.

8. The SIM card according to claim 7, wherein said subnumber field contains a subnumber data record having an identifier of a number type and a number.

9. The SIM card according to claim 7, wherein said group field contains a group data record containing an identifier of a group name and a reference sector referring to an overgroup.

10. The SIM card according to claim 8, wherein in dependence on said subaddresses, said link field identifies one of said subnumber field and said group field.

* * * * *